Figure 1:
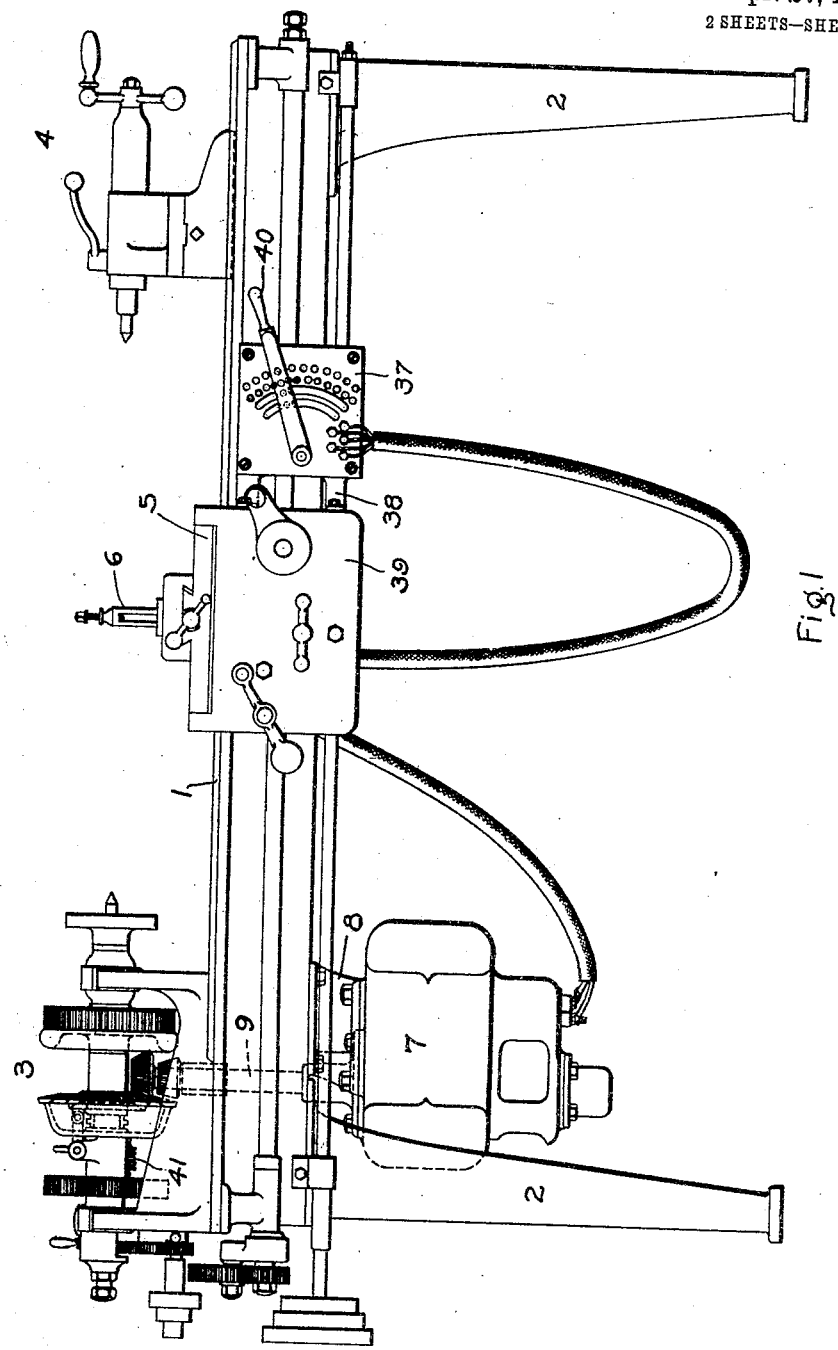

E. R. WHITNEY.
ELECTRIC DRIVE FOR MACHINES.
APPLICATION FILED NOV. 8, 1904.

919,986.

Patented Apr. 27, 1909.
2 SHEETS—SHEET 2.

Witnesses
Lloyd C. Bush
Helen Orford

Inventor
Eddy R. Whitney
by Albert G. Davis
Att'y.

UNITED STATES PATENT OFFICE.

EDDY R. WHITNEY, OF LYNN, MASSACHUSETTS, ASSIGNOR TO GENERAL ELECTRIC COMPANY, A CORPORATION OF NEW YORK.

ELECTRIC DRIVE FOR MACHINES.

No. 919,986.　　　Specification of Letters Patent.　　　Patented April 27, 1909.

Application filed November 8, 1904. Serial No. 231,833.

*To all whom it may concern:*

Be it known that I, EDDY R. WHITNEY, a citizen of the United States, residing at Lynn, county of Essex, State of Massachusetts, have invented certain new and useful Improvements in Electric Drives for Machines, of which the following is a specification.

The present invention relates to power-driven machinery and particularly to such machinery in which the power is furnished by a motor mounted directly upon the machine or machinery.

It has become the custom in recent years to furnish individual machines or machine tools with separate electric motors for driving the same; variations in speeds of the machines being produced by providing a number of steps by means of different sets of gearing and by controlling the motor speed between the various steps in order that a smooth graduation of speed may be obtained from the lowest working speed of the machine to the maximum speed. It is desirable that the external dimensions of most machine tools be kept as small as possible in order to save floor space, and where an individual motor drive is employed it is advantageous to have the motor so situated that the machine and its driving motor occupy no more or little more space than the machine itself, or than the machine and the old style of driving connections from a counter-shaft. Heretofore the motor has been placed at one side of the machine to be driven, or above the machine, and connected thereto by suitable gearing; but in the one case the motor occupies an additional amount of space, and in the other it is not most advantageously placed.

The object of the present invention is to so arrange the individual drive of a machine that the machine and its motor occupy no more space than the machine itself; the motor is advantageously situated to apply the driving power; and the construction as a whole consists of but few parts arranged to form a simple and compact piece of apparatus.

Specifically speaking, the present invention contemplates the arranging of thé driving motor directly beneath the bed or body of the machine with its shaft extending vertically through the bed or body and having one or more gears which intermesh with complementary gears upon the moving member of the machine to be driven, together with a motor controller, supported at a point where it may at all times be within convenient reach of the operator.

The present invention is particularly applicable to machines in which the working parts occupy but little vertical space and are supported at a height convenient to the operator, since the driving motor may be placed between the body of the machine and the floor or other support without requiring any material alterations to be made in the machine or its support; the invention not being limited, however, to use in such machines.

The present invention will be more fully understood in connection with the following description thereof.

Figure 2:
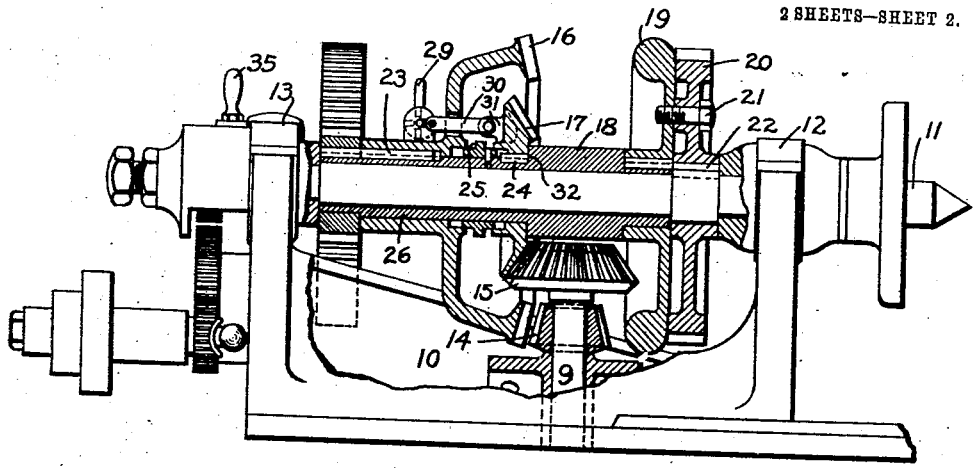
Figure 3:
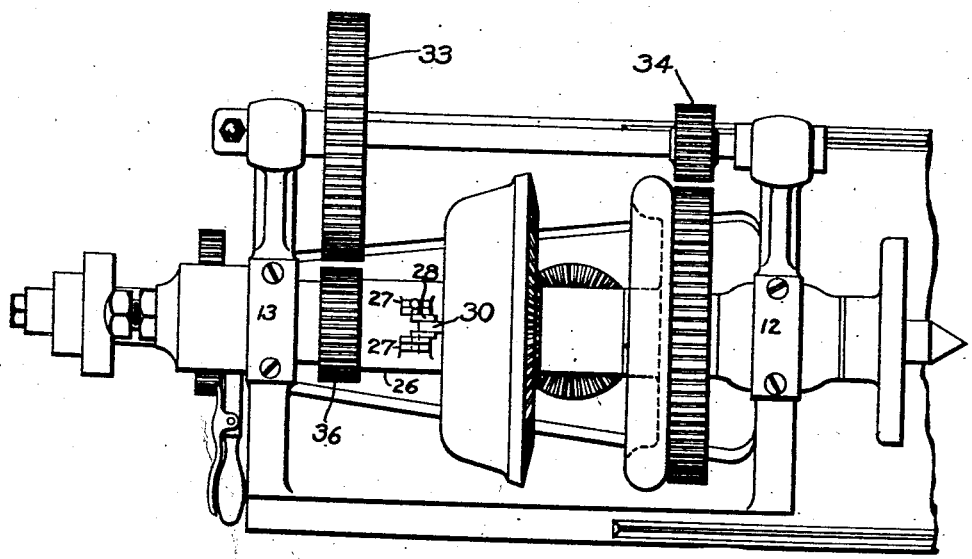

In the accompanying drawings, Figure 1 is a side elevation of a lathe to which my invention is applied; Figs. 2 and 3 are detail views of the lathe shown in Fig. 1, illustrating the mode of connecting the motor shaft to the lathe spindle.

Similar reference characters will be used throughout the specification and drawings to indicate corresponding parts.

1 indicates a lathe bed of any usual or desired construction, suitably supported upon legs or standards 2, and provided at one end with a head stock 3 and with an adjustable tail stock 4, together with the movable lathe carriage 5 having a tool rest 6. The driving motor 7 is supported beneath the lathe bed at a point below the head stock and, in the particular modification illustrated, is suspended directly from the lathe bed by means of brackets 8 suitably secured to the lathe bed and the motor respectively. The shaft 9 of the motor is arranged vertically and projects upwardly through an opening 10 in the lathe bed. The lathe spindle is indicated by 11 and is supported in any usual manner, as within bearings 12 and 13. The motor shaft and the lathe spindle are provided with complementary gears which are preferably beveled gears, as illustrated; two sets of these gears are illustrated although the number may be varied to suit conditions. The beveled gears 14 and 15 are secured to the motor shaft while the complementary gears 16 and 17 are loosely supported upon the lathe spindle, but are adapted to be connected thereto at will, in order that the spindle may be driven either through gears 14 and 16 or through gears 15 and 17. The gears 16 and 17 may be arranged upon the lathe spindle in various ways, the present invention not being limited to the particular arrangement illustrated, which is as follows: A sleeve 18 surrounds the spindle and extends substantially throughout the entire distance between the bearings 12 and 13. This sleeve is loose on the spindle and carries at one end the hand wheel 19 which is adapted to be secured to the gear 20 by means of a bolt or bolts 21. Gear 20 is splined to the spindle at 22, so that when the bolt 21 is in position the sleeve and spindle revolve together. Gears 16 and 17 are mounted directly upon the sleeve 18 and are splined thereto at 23 and 24, respectively, but are free to move endwise upon the sleeve. A stop 25, secured to or forming part of the sleeve 18, is arranged between the gears 16 and 17, the purpose of the stop being to limit the movement of each of the gear wheels in one direction. Gear wheel 16 is formed with an elongated hub 26 having projecting ears 27. A crank or eccentric 28 is revolubly supported between the ears 27 and is provided with a detachable handle 29 for rotating it. A link 30 is pivotally secured at its opposite ends to the crank or eccentric 28 and to the ear 31 upon the gear wheel 17, forming thereby an adjustable connection between the two gear wheels. The parts are so arranged that when the crank or eccentric is turned in one direction, gear wheel 17 is moved against a shoulder 32 upon the sleeve 18 and into engagement with its companion gear 15 upon the motor shaft as shown in Fig. 2 and gear wheel 16 is positively forced out of engagement with gear 14; while upon turning the crank or eccentric in the opposite direction, namely, through an angle of 180 degrees from the position which it occupies in Fig. 2, gear 17 is first moved out of engagement with gear 15 and brought against stop 25, whereupon it is brought to rest and gear 16 is moved along the sleeve until its teeth mesh with those of gear 14 upon the motor shaft. By this arrangement when gears 15 and 17 are brought into engagement with each other gears 14 and 16 are positively disengaged, and gears 15 and 17 are positively disengaged when gears 14 and 16 are made to intermesh with each other.

The two sets of beveled gears provide two speeds for the lathe spindle relative to the motor shaft and a third and a fourth relative speed may be obtained by throwing in the back gears 33 and 34. Normally, gears 33 and 34 are inactive, but when it is desired to bring them into play, the bolt 21 is removed, disconnecting sleeve 18 from the lathe spindle and permitting it to rotate freely. At its end adjacent bearing 13, sleeve 18 is provided with a pinion 36 which is adapted to intermesh with gear wheel 33 when the back gear is thrown in, and at the same time pinion 34 meshes with gear 20. Then, when sleeve 18 is driven by either set of beveled gears, the spindle is driven by means of the train gears 36, 33, 34 and 20; giving in either case a lower speed than that which results when the spindle is driven directly from the sleeve 18. A spring 41 may be placed between gear wheel 16 and pinion 36 for normally exerting a tension upon said wheel.

By the present invention the driving motor and the connections therefrom occupy no additional space, but are encompassed within the lines of the lathe as adapted for operation from a countershaft; a saving is effected of the space required by the belt or other driving connection between the lathe and countershaft; and the power is transmitted directly from the motor to the lathe spindle. Furthermore, the motor is protected by virtue of its location and is in no danger of being injured during the moving of the machine from one place to another.

For controlling the motor I have provided a motor controller 37 carried by brackets 38 which are secured to the apron 39 of the carriage 5. The handle 40 of the controller is shown in its "off" position and, when it is moved in one direction the motor is reversed, while when moved in the opposite direction the motor is given a forward direction of rotation and its speed varied at will from the lowest to the highest speed. The motor controller is so arranged that the range of the motor speed is equal, or approximately equal, to the steps which are secured by shifting one or the other set of beveled gears into engagement with each other with and without the back gears; so that the lathe spindle is driven at substantially the same speed when the motor is running at its highest speed and one set of gear connections is employed and when the motor is running at its lowest speed and the relative speed of the spindle is increased by one step through gear changes.

Although the present invention is illustrated as applied to a lathe which is elevated upon legs or standards, the present invention is not limited to such use, since it may be employed in connection with lathes of different types and upon other machines wherein it is desired to arrange the machine and driving motor in a simple and compact form.

What I claim as new and desire to secure by Letters Patent of the United States is:

In combination, a lathe bed, legs supporting the bed, a motor housed beneath and supported from said lathe bed and contained within the lines of the bed and legs, the shaft of said motor extending vertically through said bed, a horizontal lathe spindle arranged above the lathe-bed, and a driving connection between the motor shaft and the lathe spindle.

In witness whereof I have hereunto set my hand this third day of November 1904.

EDDY R. WHITNEY.

Witnesses:
JOHN A. McMANUS, Jr.,
DUGALD McK. McKILLOP.